United States Patent [19]

Green et al.

[11] Patent Number: 5,356,733
[45] Date of Patent: Oct. 18, 1994

[54] BATTERY ACID DEFLECTOR

[75] Inventors: Greg Green, Oak Grove, Mo.; Tosh Uba, Lakewood, Colo.

[73] Assignee: Hawker Energy Products, Inc., Warrensburg, Mo.

[21] Appl. No.: 146,285

[22] Filed: Oct. 29, 1993

[51] Int. Cl.⁵ .............................................. H01M 2/36
[52] U.S. Cl. ........................................ 429/72; 429/80; 137/260
[58] Field of Search ........................ 429/72, 63, 80; 141/339; 137/260

[56] References Cited

U.S. PATENT DOCUMENTS

| | | | |
|---|---|---|---|
| 3,062,229 | 11/1962 | Riggs | 137/260 |
| 4,353,968 | 10/1982 | Boyle | 429/64 |
| 4,386,141 | 5/1983 | Weidner et al. | 137/260 X |
| 4,833,047 | 5/1989 | Jsoi et al. | 429/72 |
| 5,266,420 | 11/1993 | Wang | 429/72 |

Primary Examiner—Anthony Skapars
Attorney, Agent, or Firm—Lorusso & Loud

[57] ABSTRACT

A normally sealed multi-cell, lead-acid battery of the starved electrolyte type has each cell filled with a metered quantity of electrolyte by drawing down a vacuum on one or more of the cells; releasing the vacuum; and simultaneously drawing, through a filling port in the lid of each cell under vacuum, the metered quantity of electrolyte. Each cell houses a cell pack comprising at least one porous positive plate; at least one porous negative plate; and a porous, relatively fragile microfiber glass mat separator interleaved between the plates. A deflector platform, integral with the lid and having a deflecting surface, is positioned between the filling port and the cell pack of each cell of the battery. During filling, the electrolyte impinges upon the deflecting surface and is deflected laterally so that the electrolyte does not directly impinge upon and damage the cell pack.

6 Claims, 2 Drawing Sheets

BATTERY ACID DEFLECTOR

BACKGROUND OF THE INVENTION

The present invention relates generally to single or multi-cell, lead-acid batteries and in particular, to a method of filling such a battery with electrolyte without damaging the cell pack(s) within the battery and to the design of the battery which incorporates integral deflector surfaces within the battery that are used in the filling process to protect the cell pack(s). Each cell of a single cell or a multi-cell, lead-acid battery of the starved electrolyte type utilizing in situ formation is defined by a compartment which houses a cell pack comprising at least one porous positive plate, at least one porous negative plate, and a porous, relatively fragile, microfiber glass mat separator. Normally, the positive and negative plates are formed of lead grids on which the active material of the plate is affixed by pasting. The cell packs within each compartment are positioned directly beneath filling ports of the compartment through which the electrolyte is introduced into the battery.

A multi-cell, lead-acid battery is filled with electrolyte by drawing a high vacuum on one or more of the battery's cells. After sufficient time has passed to remove all of the air from the porous separator and the porous plates, the acid can either be injected into the cell compartment(s) under pressure or drawn into the cell compartment(s) by the vacuum. The high vacuum causes the electrolyte to rush into the cell compartment(s) through the filling port(s) of the cell(s) with force. Due to the fragile nature of the microfiber glass mat separator(s) in each cell pack and manner in which the positive and negative plates of each cell pack are formed, electrolyte impinging directly on a cell pack can damage the cell pack. The direct impingement of the inrushing electrolyte on the cell pack can damage or displace the fragile, microfiber glass mat separator reducing one of the primary functions of the separator which is to provide separation between the positive and negative electrodes. This will lead to early cell failure due to shorting across the area where the separator was damaged during the filling of the battery. In addition, should the positive and/or negative plates of the cell be exposed to the inrushing electrolyte by damage to and/or the displacement of the microfiber glass mat separator during the filling process, the active material of the plates can be displaced from the lead grids of the plates setting up a shorting path within the cell pack.

Previously, attempts have been made to solve the above problems by placing paper or plastic deflectors on the upper surface of the cell packs. However, this approach to the problem has proved to be only marginally satisfactory. This method of protecting the cell packs during the high vacuum filling operation requires the use of assembly personnel to cut and place the paper deflectors on the cell packs thereby increasing the costs of producing the battery. In addition, the assembly personnel may inadvertently forget to place a paper deflector in each cell compartment or may misplace a paper deflector in one or more of the cell compartments or the paper deflector may shift out of position after placement and prior to the filling operation. Any of these occurrences will expose the cell pack to damage and can result in the problems discussed above.

Thus, there has been a need to provide a method and battery structure which will enable the filling of single cell or multi-cell, lead-acid batteries on an assembly line by drawing a high vacuum wherein the cell packs of the battery do not become damaged during the filling operation.

SUMMARY OF THE INVENTION

The present invention provides a method of filling a single cell or a multi-cell, lead-acid battery of the starved electrolyte type utilizing in situ formation, with electrolyte without damaging the cell pack(s) within the battery and a battery design which includes an integral deflecting surface within the battery to facilitate the filling process. The lid of the battery is provided with a deflector platform having a deflecting surface located directly beneath the filling port of each cell compartment. The deflector platform is formed integrally with the lid when the lid is molded. Thus, the deflector platform is always in place beneath the filling port to deflect the electrolyte during the filling operation and the placement of paper deflectors within the cell compartments by assembly line personnel, along with the potential problems associated with such an assembly line operation, is eliminated.

The single cell or multi-cell, lead-acid battery of the starved electrolyte type is filled with a metered quantity of electrolyte by drawing a high vacuum (less than 15 mm Hg and normally between 5-10 mm Hg) on one or more cells of the battery. The high vacuum is then retained until all of the air in the separator(s) and plates is removed. Then, a metered quantity of electrolyte is drawn or forced through the filling port(s) into the cell compartment(s). The inrushing electrolyte impinges upon the deflector surface of the deflector platform located directly beneath the filling port(s) and is deflected laterally so that the electrolyte can not impinge directly on the cell pack and damage the cell pack. The deflector surface or surfaces of the deflector platform are each located in a plane that passes through a sidewall of the battery without passing through the cell pack. This assures that the deflected electrolyte will be deflected laterally without directly impinging upon the upper surface of the cell pack.

DETAILED DESCRIPTION OF THE PREFERRED EMBODIMENTS

Figure 1:
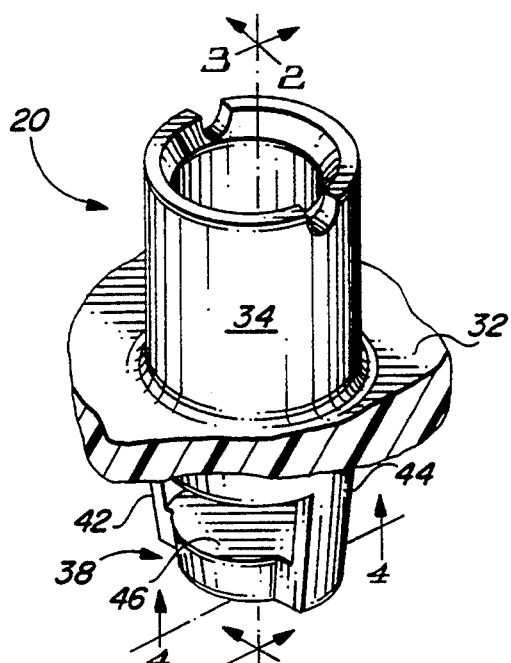
FIG. 1 is a perspective view a portion of the battery lid showing the filling port and the integral deflector platform of the present invention.
Figure 5:
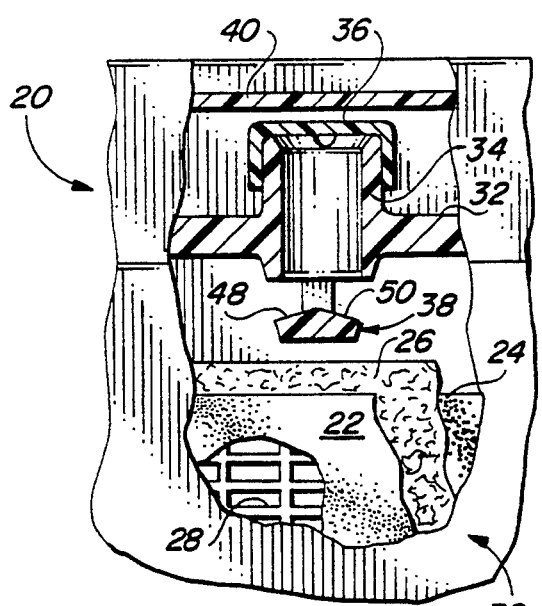
FIG. 5 is a partial side view of the battery, with a portion broken away, to show the relationship between the filling port, the deflector platform and the cell pack.
Figure 2:
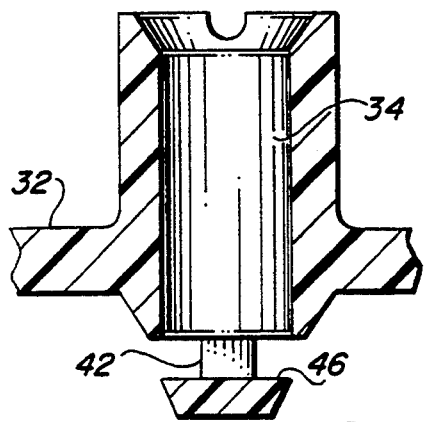
FIG. 2 is a section taken substantially along lines 2—2 of FIG. 1.
Figure 3:
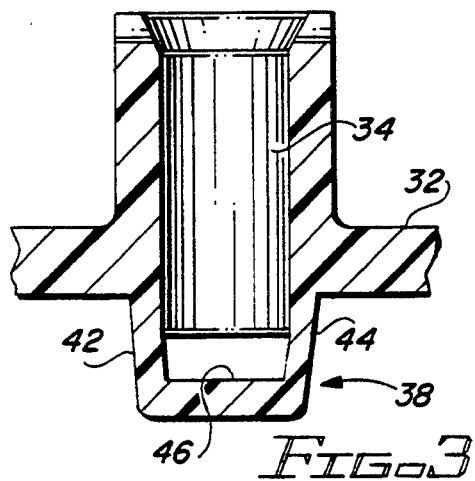
FIG. 3 is a section taken substantially along lines 3—3 of FIG. 1.
Figure 4:
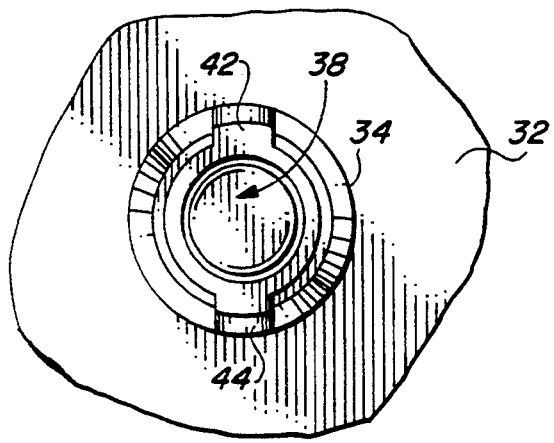
FIG. 4 is a top view of the filling port and deflector platform of FIG. 1.

Referring now to FIGS. 1 and 5, portions of a normally sealed, multi-cell, lead-acid battery 20 of the starved electrolyte type are illustrated. The multi-cell, lead-acid battery 20 is of the type utilizing in situ formation disclosed in U.S. Pat. No. 5,182,178, to Brizendine et al, issued Jan. 26, 1993, and entitled SUPPRESSION OF ELECTROLYTE LEAKAGE FROM THE TERMINAL OF A LEAD-ACID BATTERY, and the disclosure of this patent is hereby incorporated herein in its entirety by reference.

The multi-cell, lead-acid battery 20, comprises a plurality of cells connected in series. Each cell is defined by a compartment housing a cell pack 21 which includes at least one porous positive electrode plate 22; at least one porous negative electrode plate 24; at least one porous absorbent separator mat 26 interleaved between and pressed against the opposite polarity plates; and a sulfuric acid electrolyte absorbed within the porous plates and the separator. Normally, the positive and negative electrode plates 22 and 24, respectively, are formed of lead grids 28 on which the active material of the plate is affixed by pasting. The separators 26 are normally porous, relatively fragile, microfiber glass mat separators.

The components of the battery 20 are housed within a container 30. The container 30 generally comprises a standard open-mouthed housing to which is affixed, by heat sealing, an adhesive or the like, an inner lid 32. The inner lid 32 is a fairly complex molded part provided with tubular filling ports or vent openings 34 through which the electrolyte is introduced into the cells of the battery during the filling operation and through which gas is released if the internal pressure of the battery exceeds a predetermined threshold pressure during service.

The tubular filling ports or vent openings 34 are closed, after the electrolyte filling operation, with bunsen resealable valves 36 to permit and regulate the gas release from the battery. Each filling port or vent opening 34 is also provided with an integral deflector platform 38 positioned directly below the port or opening 34 to prevent damage, during the electrolyte filling operation, to the cell pack 21 housed within the compartment.

The entire inner lid 32, including the deflector platform 38, is formed in a single molding process. Preferably, the lid 32 is formed by injection molding a suitable engineering plastic material which is resistant to sulfuric acid, including such plastic materials as: NORYL (polyphenylene oxide) plastic, ABS, polypropylene, and the like. An intermediate cover 40 is positioned over the bunsen valve(s) and normally, an outer, cosmetic cover (not shown) is snap fitted over the inner lid 32.

As shown in FIGS. 1-5, each circular deflector platform 38 is supported a short distance directly below and is centered with respect to one of the filling ports 34 by a pair of diametrically opposed support arms 42 and 44. When the filling port 34 is cylindrical in shape as shown in FIGS. 1-5, the diameter of the deflecting surface 46 of the deflector platform 38 is equal to the internal diameter of the filling port 34. When the filling port is frusto-conical in shape, decreasing in diameter from top to bottom, the diameter of the deflecting surface 46 of the deflector platform 38 is normally equal to the internal diameter of the filling port 34 at its lower end. However, in certain instances, where the draft angle of the frusto-conical filling port is great enough, the diameter of the deflecting surface of the deflector platform can be slightly smaller in diameter than the diameter of the lower end of the filling port and the electrolyte will still impinge on the deflecting surface before contacting the cell pack or any other surface within the cell. Accordingly, with the deflector platform of the present invention, there is no direct path between the filling port and the upper surface of the cell pack 21 within the compartment. Thus, electrolyte passing through the filling port 34 into the cell compartment during the high vacuum filling operation first impinges on the deflecting surface before contacting the cell pack or any other surface within the cell.

The deflecting surface 46 shown in FIGS. 1-4 is flat and located in a horizontal plane. However, as shown in FIG. 5, the deflecting surface 46 can comprise more than one section and these sections 48 and 50 can be located in planes oriented at varying angles with respect to the horizontal as long as the planes do not pass through the cell pack 21.

Figure 6:
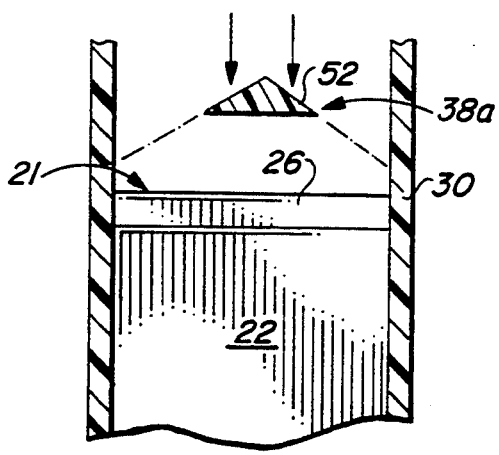
FIGS. 6 and 7 are transverse sections through a battery to show how the inclination of the deflector surface can vary depending on the spacing between the deflector surface and the upper surface of the cell pack.
Figure 7:
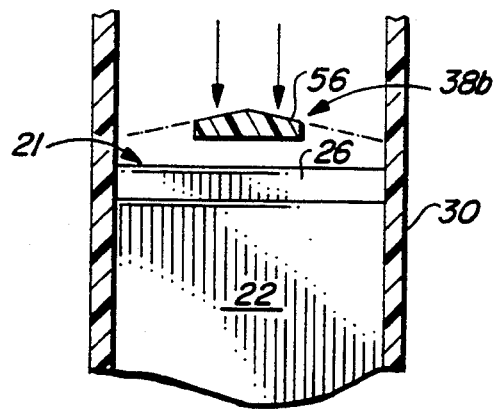
Figure 8:
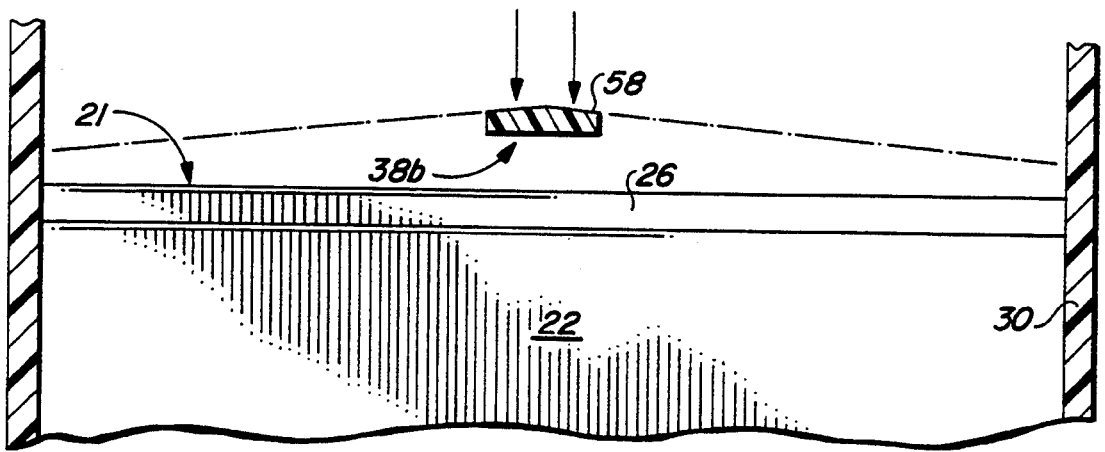
FIGS. 8 and 9 are longitudinal sections through a battery to show how the inclination of the deflector surface can vary depending on the spacing between the deflector surface and the upper surface of the cell pack.
Figure 9:
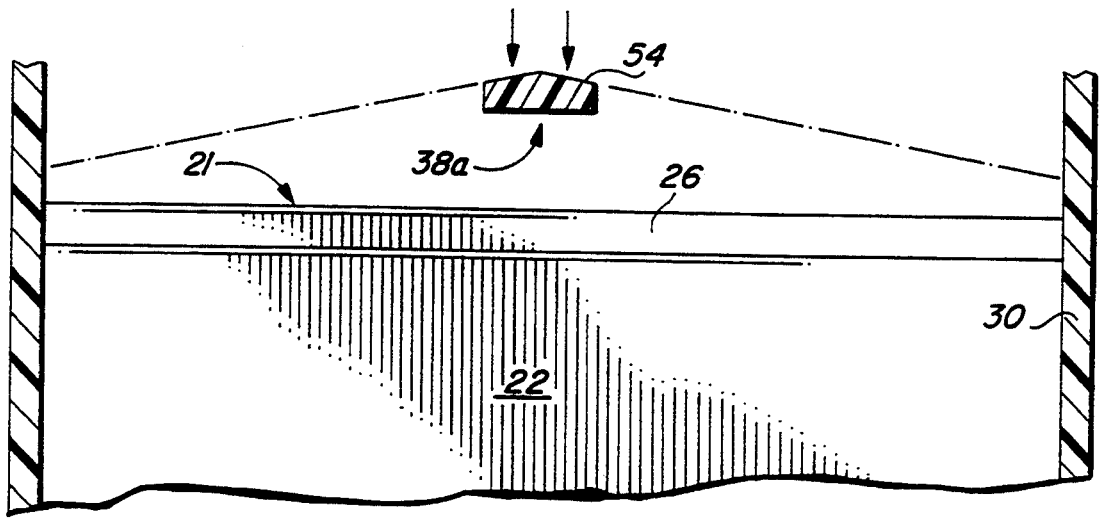

FIGS. 6-9, show different deflecting surfaces 46 and how the sections of the deflecting surface can be oriented at varying angles with respect to the horizontal depending on the height of the deflecting surface above the cell pack 21 and the distance from the deflecting surface to the battery sidewall. As shown, the distances from the deflector platform 38a of FIGS. 6 and 9 and the deflector platform 38b of FIGS. 7 and 8 to the sidewalls of the battery container 30 are the same. However, the deflector platform 38a of FIGS. 6 and 9 is positioned farther above the cell pack 21 of the battery than the deflector platform 38b of FIGS. 7 and 8. Accordingly, the deflecting surface sections 52 and 54 of the deflector platform 38a can be inclined at a greater angle to the horizontal than the deflecting surface sections 56 and 58 of the deflector platform 38b without having the planes containing the sections passing through the cell pack. Thus, as shown by the arrows in FIGS. 6-9, electrolyte flowing into the battery through the filling ports 34, during a high vacuum filling operation, will first impinge upon the deflecting surface of the deflector platforms where it is deflected into the sidewalls of the container 30 to dissipate the forces of the inrushing electrolyte before it flows down into the cell pack 21. As discussed above, this protects the separator mat 26 of the cell pack 21, which normally projects above the electrode plates 22 and 24, from damage and/or displacement when the battery is being filled with electrolyte. Damage to or the displacement of a separator mat can reduce one of the primary functions of the separator which is to provide separation between the positive and the negative electrodes which will lead to failure due to shorting across the area where the separator was damaged or result in the formation of a shorting path through the displacement of the paste from one or more of the electrode plates. In addition, by protecting the cell pack(s) as described above, the deflector platforms enable the electrolyte to be injected through the filling ports under pressure to reduce the time for the filling operation.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of filling, with electrolyte, a normally sealed multi-cell, lead-acid battery of the starved electrolyte type utilizing in situ formation, each cell defined by a compartment housing a cell pack formed of at least one porous positive plate, at least one porous negative plate, and a porous, relatively fragile microfiber glass mat separator interleaved between the plates, and a lid with a filling port provided for and closing each cell compartment, comprising the steps of:

providing the lid with an integral electrolyte deflector platform having a deflecting surface positioned between each said filling port and the cell pack of each cell of the battery;

drawing a vacuum on one or more of the cells; and after substantially all of the air is removed from the cell(s), drawing through the filling port(s) a metered quantity of electrolyte into each cell whereby the electrolyte impinges on the deflecting surface of the deflector platform and is deflected laterally away so as to avoid directly striking the cell pack, thereby precluding damage to the cell pack and the relatively fragile microfiber glass mat separator of the cell pack.

2. The method of claim 1, wherein: a plane containing the deflecting surface intersects a sidewall of said battery without passing through the cell pack.

3. The method of claim 1, wherein: a vacuum of less than 15 mm Hg is drawn on one or more of the cells.

4. The method of claim 1, wherein: the electrolyte is injected through the filling port(s) under pressure to reduce the time for filling the cell(s).

5. In a normally sealed multi-cell, lead-acid battery of the starved electrolyte type utilizing in situ formation, wherein each cell of the battery comprises a compartment having a lid with a filling port and houses a cell pack, located beneath and spaced from the filling port, the cell pack comprising at least one porous positive plate, at least one porous negative plate, and a porous, relatively fragile microfiber glass mat separator interleaved between the plates, the improvement comprising:

a deflector platform for each cell integral with the lid and having a deflecting surface located between the filling port and the cell pack of each cell of the battery; the deflecting surface being in a plane that intersects a sidewall of the battery without passing through the cell pack whereby when the battery is being filled with electrolyte by drawing a high vacuum on one or more of the cells, the electrolyte impinges on the deflecting surface and is deflected laterally to avoid directly striking the cell pack thereby precluding damage to the cell pack and in particular, the porous relatively fragile microfiber glass mat separator of the cell pack.

6. The multi-cell, lead-acid battery of claim 5, wherein: the deflector platform has at least two deflecting surface sections with each of the deflecting surface sections being in a plane which intersects a sidewall of the battery without passing through the cell pack.

* * * * *